US008193977B1

(12) United States Patent
Ryan

(10) Patent No.: US 8,193,977 B1
(45) Date of Patent: Jun. 5, 2012

(54) POWER LINE GPS DATA DISTRIBUTION

(75) Inventor: David J. Ryan, Jackson, WY (US)

(73) Assignee: Broadcom Corporation, Irvine, CA (US)

( * ) Notice: Subject to any disclaimer, the term of this patent is extended or adjusted under 35 U.S.C. 154(b) by 66 days.

(21) Appl. No.: 11/789,467

(22) Filed: Apr. 24, 2007

(51) Int. Cl.
*G01S 19/03* (2010.01)
(52) U.S. Cl. .................................................. 342/357.4
(58) Field of Classification Search ............... 342/357.4
See application file for complete search history.

(56) References Cited

U.S. PATENT DOCUMENTS

| | | | | |
|---|---|---|---|---|
| 5,812,086 A | * | 9/1998 | Bertiger et al. | 342/357.06 |
| 5,815,114 A | * | 9/1998 | Speasl et al. | 342/357.06 |
| 5,832,364 A | * | 11/1998 | Gustafson | 455/14 |
| 6,151,480 A | * | 11/2000 | Fischer et al. | 340/310.12 |
| 6,256,507 B1 | * | 7/2001 | Lemieux | 455/502 |
| 6,492,897 B1 | * | 12/2002 | Mowery, Jr. | 455/522 |
| 6,542,754 B1 | * | 4/2003 | Sayers et al. | 455/502 |
| 7,212,550 B2 | * | 5/2007 | Kauhanen | 370/503 |
| 7,558,356 B2 | * | 7/2009 | Pollman et al. | 375/367 |
| 7,642,936 B2 | * | 1/2010 | Bales et al. | 341/87 |
| 2003/0006881 A1 | * | 1/2003 | Reyes | 340/310.01 |
| 2003/0084047 A1 | * | 5/2003 | Williamson | 707/10 |
| 2004/0022304 A1 | * | 2/2004 | Santhoff et al. | 375/219 |
| 2005/0164666 A1 | * | 7/2005 | Lang et al. | 455/282 |

FOREIGN PATENT DOCUMENTS

WO  WO 0207640 A1 * 9/2002

OTHER PUBLICATIONS

M.K.Lee et al, "HomePLug 1.0 Powerline Communication LANs—Protocol Description and Performance Results," International Journal of Communication Systems, Sep. 2002, pp. 1-25.*
Ambient, "Broadband Over Power Lines Technology" White Paper, Aug. 2006, pp. 1-10.*
RAD data communications, "Cost Effective Backhaul for 2G to 3G Migration and Beyond," pp. 1-12, Feb. 2007.*
Airvana, "All-IP 1xEV-D0 Wireless Data Networks A technical White Paper," pp. 1-13, Aug. 2004.*
NMS Communications, "RAN Backhaul Migration to IP", AccessGate Application Note, Apr. 2006, pp. 1-4.*

* cited by examiner

*Primary Examiner* — Gregory C Issing
(74) *Attorney, Agent, or Firm* — Sterne, Kessler, Goldstein & Fox PLLC

(57) ABSTRACT

Distributing data is disclosed. A GPS signal is received from one or more GPS satellites. GPS data associated with at least a portion of the GPS signal is distributed via a power line. In some cases, at least a portion of the distributed signal is used to establish a reference.

27 Claims, 5 Drawing Sheets

POWER LINE GPS DATA DISTRIBUTION

BACKGROUND OF THE INVENTION

Global Positioning System (GPS) receivers have been used to provide location, time, timing, and/or frequency reference information. Since GPS receivers receive signals from GPS satellites, GPS receivers often require a view of the sky for proper operation. In indoor environments where GPS data is desired but a view of the sky is unavailable, typically an external GPS antenna/receiver is installed outdoors and connected by dedicated wires to an indoor device desiring the GPS data. Since such an installation requires installing a wire between the outdoor GPS antenna/receiver and the indoor GPS device, the installation is difficult for most users. Therefore there exists a need for an easier way to obtain GPS data in a variety environments.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process, an apparatus, a system, a composition of matter, a computer readable medium such as a computer readable storage medium or a computer network wherein program instructions are sent over optical or communication links. In this specification, these implementations, or any other form that the invention may take, may be referred to as techniques. A component such as a processor or a memory described as being configured to perform a task includes both a general component that is temporarily configured to perform the task at a given time or a specific component that is manufactured to perform the task. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Distributing GPS data is disclosed. In some embodiments, a GPS signal received from one or more GPS satellites is distributed via a power line. For example, a GPS antenna and receiver placed on a roof of a building is connected to the power, e.g., via an external power outlet. The GPS receiver is powered by power received via the power line and the GPS signal received by the GPS receiver is distributed via the same power line. A device connected to the power line receives the GPS signal via the power line. For example, an indoor device that desires GPS data without a view of the sky obtains the power line distributed GPS data. In some embodiments, by using the GPS data, the device establishes a location reference, a time reference, a timing reference, and/or a frequency reference.

Figure 1:
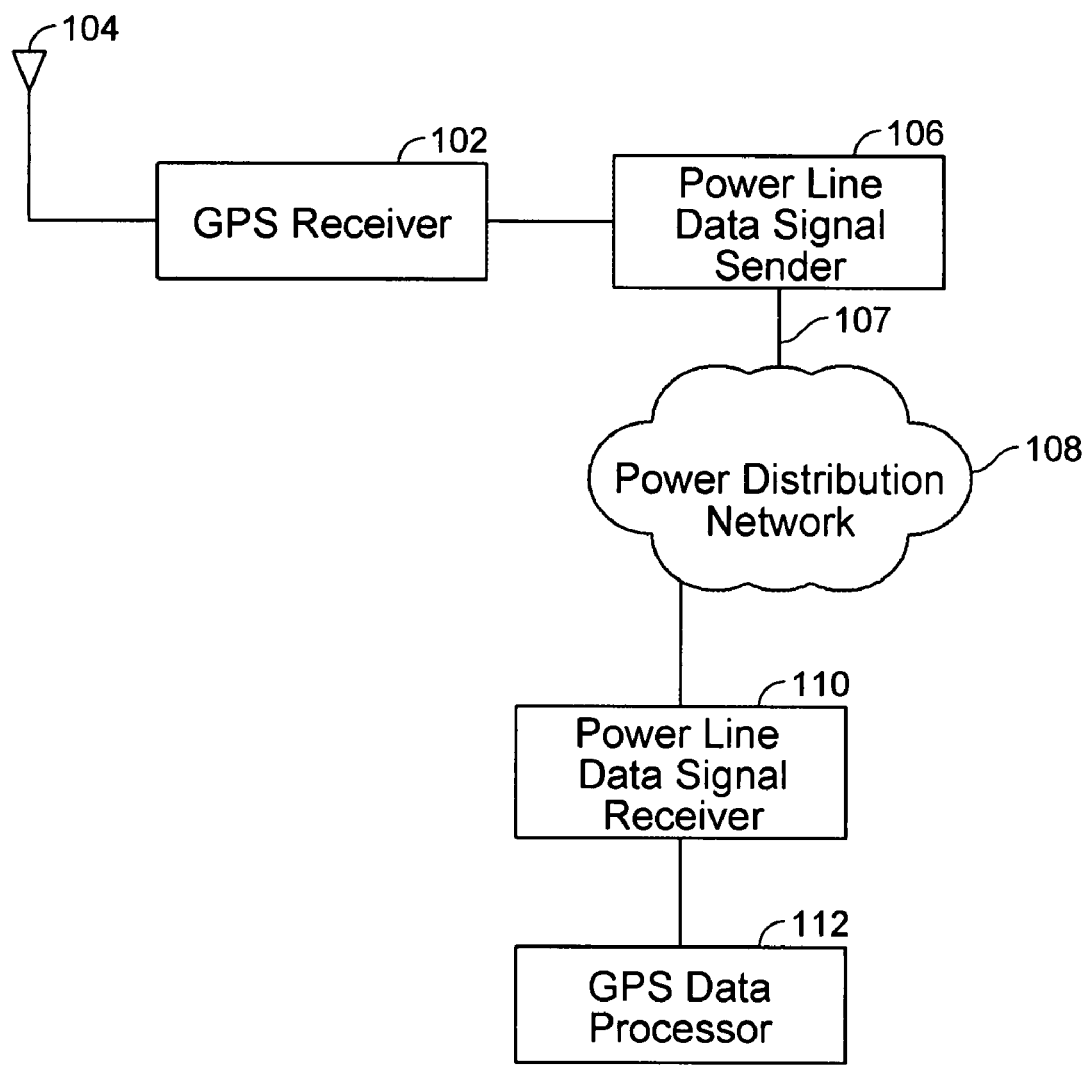
FIG. 1 is diagram illustrating an embodiment of a power line GPS distribution environment.

FIG. 1 is diagram illustrating an embodiment of a power line GPS distribution environment. GPS receiver 102 receives GPS signals via antenna 104. At least a portion of GPS data included in the GPS signal received by receiver 102 is sent (e.g., modulated) by power line data signal sender 106 for distribution via power distribution network 108. In some embodiments, antenna 104 and/or power line data signal sender 106 are integrated together with GPS receiver 102 in a single device. In some embodiments, receiver 102 and/or sender 106 receives power from power distribution network 108. For example, an integrated device including antenna 104, GPS receiver 102, and sender 106 is placed outdoors and is connected to power distribution network 108 via an electrical cord/plug 107. The integrated device receives power via cord/plug 107, and the integrated device transmits GPS data via the same cord/plug 107 for distribution via power distribution network 108 to one or more other devices connected to power distribution network 108, e.g., via wall or other outlets in locations throughout the interior spaces of a building with which power distribution network 108 is associated. Power distribution network 108 includes a network of electrical wiring (e.g., power line) that can provide power to one or more electrical devices. In some embodiments, power distribution network 108 includes electrical wiring/power line infrastructure of a building (e.g., a house). In some embodiments, the power distribution network is connected to a power generation source (e.g., public power utility grid). In some embodiments, GPS data from a plurality of GPS receivers are distributed via power distribution network 108.

Power line data signal receiver 110 receives from power distribution network 108 a "signal" that includes the normal electrical supply and the GPS information that has been added by the data signal sender 106. For example, a signal including GPS data and sent by power line data signal sender 106 via power distribution network 108 is received by receiver 110. In some embodiments, receiver 110 processes the received signal to obtain (e.g., demodulate) the GPS data included in the received signal. GPS data processor 112 processes the obtained GPS data of receiver 110. For example, time, timing, frequency, and/or location data is at least in part determined by processor 112 using the obtained GPS data. In some embodiments, receiver 110 and processor 112 are included in a single device. In some embodiments, by obtaining GPS data from power distribution network 108, GPS data processor 112 is able to obtain GPS data while placed in an environment not ideal for receiving GPS signals from GPS satellites. For example, an indoor base transceiver station (BTS), such as a small scale base station suitable for deployment in a home or small enterprise setting, of a cellular communication network includes receiver 110 and processor 112. In various embodiments, any number of power line data signal receivers and GPS data processors may exist. For example, a plurality of power line data signal receivers and GPS data processors receive the GPS data of GPS receiver 102 via power distribution network 108.

Figure 2:
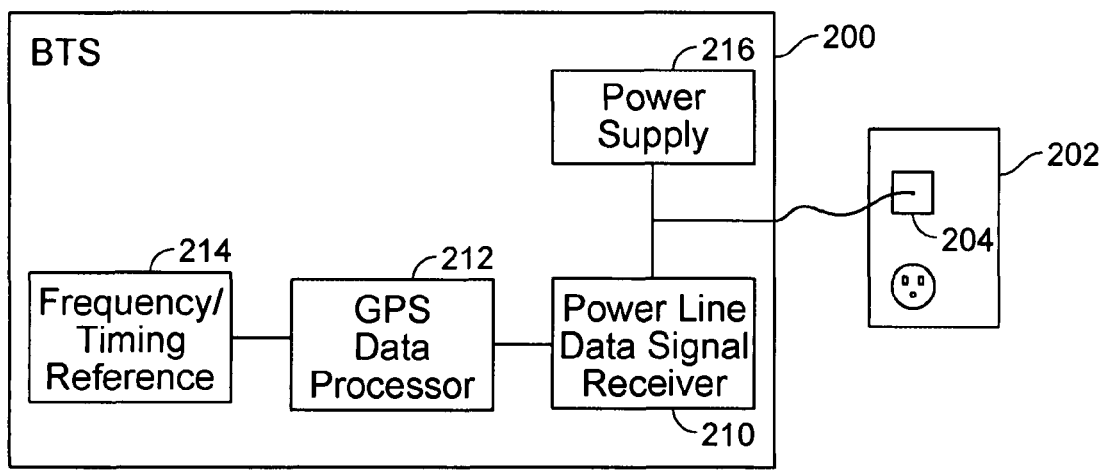
FIG. 2 is a block diagram illustrating an embodiment of a base transceiver station (BTS).

FIG. 2 is a block diagram illustrating an embodiment of a base transceiver station (BTS). BTS 200 uses GPS data to establish a timing reference for wireless signal communication. In some embodiments, BTS 200 includes power line data signal receiver 210, GPS data processor 212, frequency/timing reference 214, and power supply 216. In the example shown, one or more components of BTS 200 have been omitted from the diagram to emphasize the shown components of BTS 200. In some embodiments, power line data signal receiver 210 is power line data signal receiver 110 of FIG. 1, and GPS data processor 212 is GPS data processor 112 of FIG. 1. BTS 200 is connected to power outlet 202 via power plug 204. In some embodiments, power outlet 202 allows BTS 200 to be connected to power distribution network 108 of FIG. 1. Using the same connection to the power distribution network via plug 202, power supply 216 obtains power and power line data signal receiver 210 obtains a data signal. Power supply 216 uses the obtained power to provide power to one or more other components of BTS 200. Power line data signal receiver 210 receives a data signal including GPS data and processes the data signal to obtain the GPS data. The obtained GPS data is processed by processor 212 to at least in part determine data that can be used calibrate timing/frequency reference 214. In some embodiments, processor 212 performs other processing in addition to GPS data processing. For example, processor 212 is included in a DSP that performs mobile user communication data processing. In some embodiments, reference 214 includes an oscillator. In some embodiments, reference 214 is included a radio transceiver.

Figure 3:
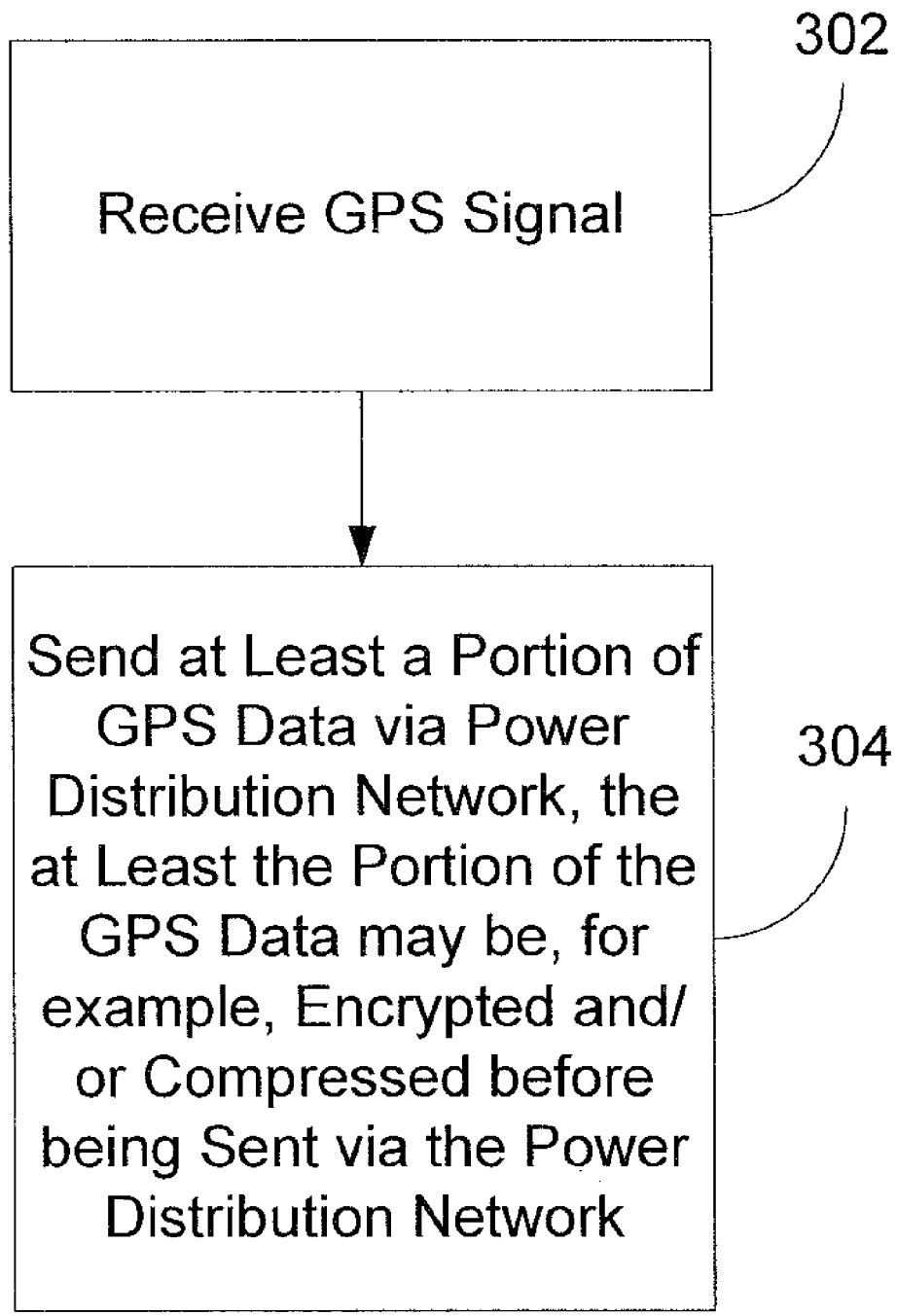
FIG. 3 is flow chart illustrating an embodiment of a process for distributing GPS data.

FIG. 3 is flow chart illustrating an embodiment of a process for distributing GPS data. In some embodiments, the process of FIG. 3 is implemented on at least in part on GPS receiver 102 and power line data signal sender 106 of FIG. 1. At 302, GPS signal is received. Receiving the GPS signal includes receiving a GPS satellite signal. In some embodiments, the GPS signal is received by GPS receiver 102 of FIG. I. At 304, at least a portion of GPS data included in the GPS signal is sent via a power distribution network. In some embodiments, sending the GPS data includes broadcasting a signal including at least a portion of the GPS data via a power line of a power distribution network (e.g. power distribution network 108 of FIG. 1). In some embodiments, the broadcasted signal includes an identifier identifying a GPS receiver. For example, by using the identifier, a power line receiver is able to distinguish between each signal of a plurality signals broadcasted from a plurality of GPS receivers. In some embodiments, sending the GPS data includes superimposing a low voltage differential data signal including GPS data on the hot and neutral lines of the power line carrying an AC power signal. In some embodiments, sending at least a portion of the GPS data includes using a power line data communication protocol such as the HomePlug protocol, the Broadband over Power Line (BPL) protocol, or the Narrowband over Power Line protocol. In some embodiments, at least a portion of the GPS data is processed before being sent. For example, at least a portion of the GPS data is encrypted and/or compressed before being sent via the power distribution network.

Figure 4:
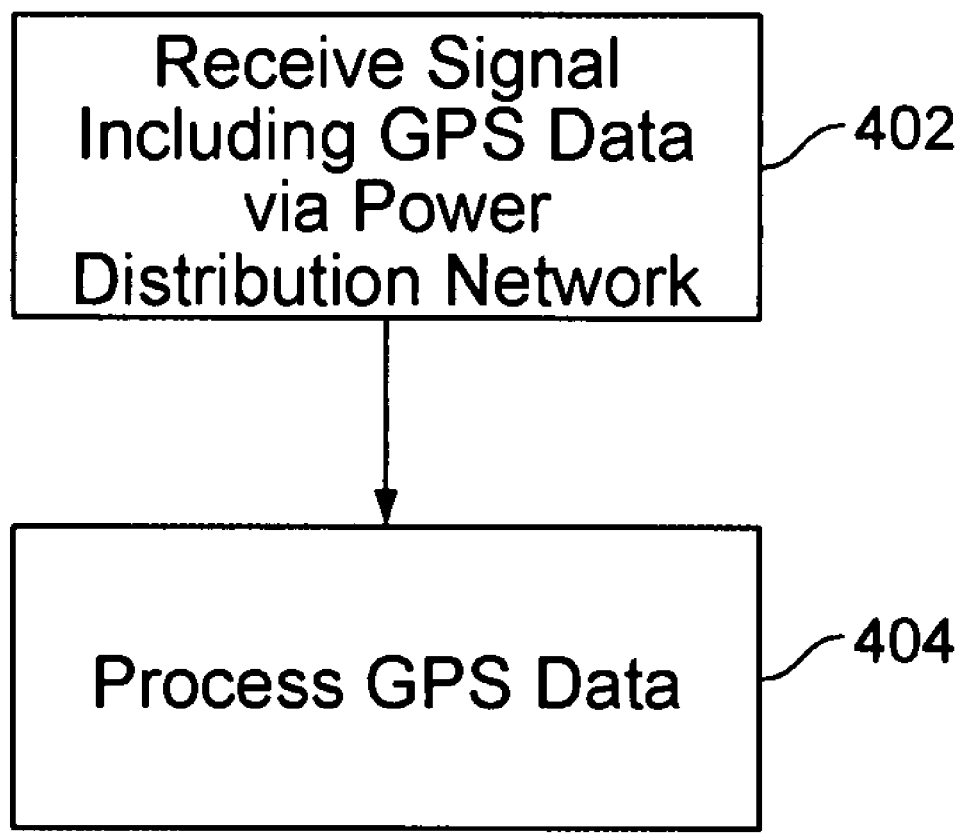
FIG. 4 is flow chart illustrating an embodiment of a process for processing GPS data.

FIG. 4 is flow chart illustrating an embodiment of a process for processing GPS data. In some embodiments, at least a portion of the process of FIG. 4 is implemented on power line data signal receiver 110 and GPS data processor 112 of FIG. 1. At 402, a signal including GPS data is received via a power distribution network. In some embodiments, receiving the signal includes demodulating the signal. In some embodiments, receiving the signal includes isolating a low voltage differential data signal superimposed on a AC power signal. In some embodiments, receiving the signal includes extracting GPS timing pulse data, GPS location data, and or other GPS data included in the signal. In some embodiments, receiving the signal includes performing processing such as decryption, decompression, and/or power line data communication protocol processing. In some embodiments, the received signal is received by power line data signal receiver 110 of FIG. 1. At 404, the received GPS data is processed. In some embodiments, the GPS data is processed by GPS data processor 112 of FIG. 1. Processing the GPS data includes using the GPS data to at least part determine a reference, such as a time reference, a timing reference, a frequency reference, and/or a location reference. For example, the GPS data is processed by a BTS to synchronize wireless data communication timing and/or determine location information (e.g., Enhanced 911 information required by Federal Communications Commission). In another example, a device such as an alarm clock, a media player, or any other consumer or commercial appliance can automatically set a clock time at least in part by using the GPS data included a power line signal received from the power distribution network. In another example, a device such as an alarm system and a medical/distress warning system can determine a location of the distress at least in part by using the GPS data included a power line signal received from the power distribution network.

Figure 5:
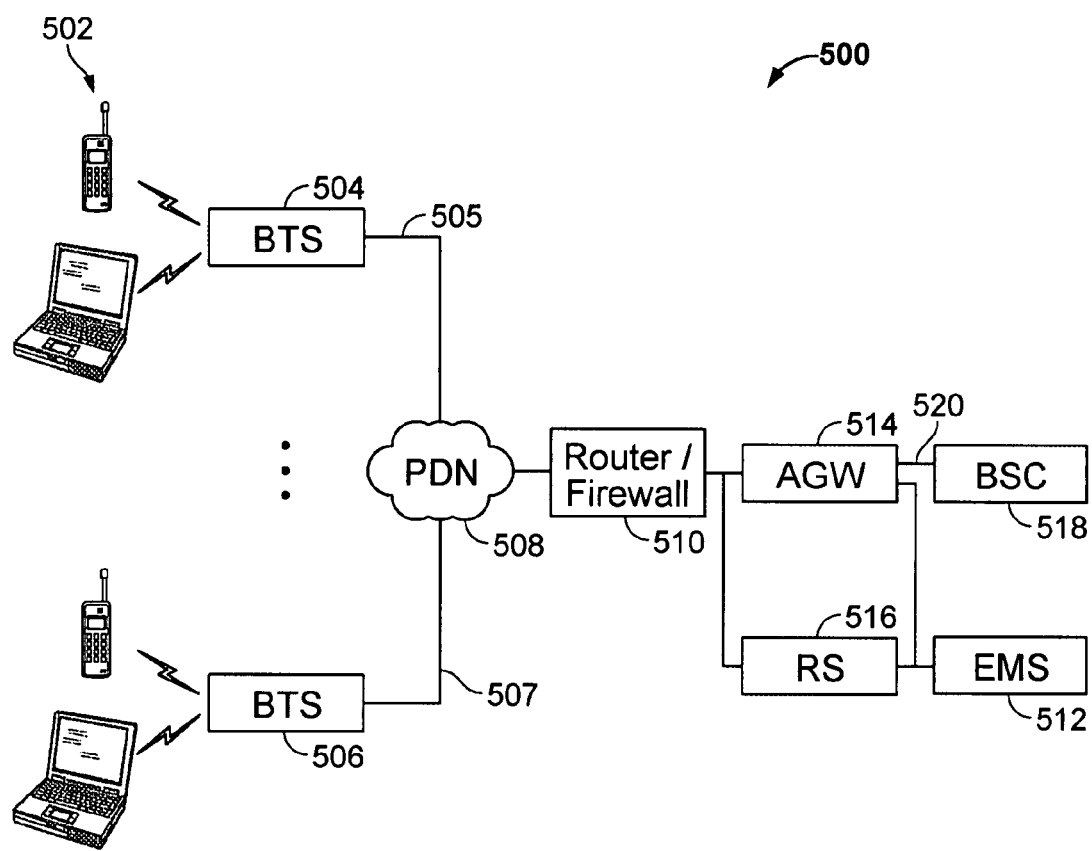
FIG. 5 is a block diagram illustrating an embodiment of a mobile network with packet data network backhaul.

FIG. 5 is a block diagram illustrating an embodiment of a mobile network with packet data network backhaul. In the example shown, the mobile network 500 includes mobile equipment 502 connected to a plurality of base transceiver stations represented in FIG. 5 by BTS 504 and BTS 506. In some embodiments, the system of FIG. 1 includes BTS 504 and/or BTS 506. In some embodiments, power line data signal receiver 110 and GPS data processor 112 of FIG. 1 are included in BTS 504 and/or BTS 506. In some embodiments, BTS 200 of FIG. 2 is included in BTS 504 and/or BTS 506. BTS 504 and BTS 506 are connected via a local Internet access connection 505 and 507, respectively, to a packet data network (PDN) 508, such as the Internet. In some embodiments, mobile network data is sent, via PDN 508, between the base transceiver stations represented by BTS 504 and BTS 506, on the one hand, and an aggregation gateway (AGW) 514, on the other, using the Internet (IP) protocol. In various embodiments, Internet access connections 505 and 507 comprise a cable, DSL, or other modem collocated with the BTS and/or a local exchange carrier central office (LEC-CO) with DSLAM or cable head-end. Also connected to PDN 508 in the example shown in FIG. 5 is a router/firewall 510 connected to and configured to provide connectivity to and security with respect to an aggregation gateway 514, and a registration server 516. In some embodiments, element management server EMS 512 is connected to router/firewall 510. In some embodiments, router/firewall 510 is omitted and/or does not include a firewall. In various embodiments, element management server 512, aggregation gateway 514, and a registration server 516 are included in one or more physical computing systems.

Element management server 512 enables an administrator to perform operational, administrative, and/or management (OAM) operations with respect to one or more mobile network elements, e.g., BTS 504 or BTS 506. Aggregation gateway (AGW) 514 receives inbound mobile network data (voice, signaling, data, control/management) from one or more base transceiver stations (BTS), via PDN 508, aggregates data from two or more base transceiver stations (if/as applicable), and provides the inbound data to BSC 518 via one or more physical ports, using time division multiplex (TDM) as prescribed by the GSM standard and the BSC OEM's proprietary implementation of the Abis interface 520. In some embodiments, the AGW 514 is capable of interfacing with more than one type of BSC, e.g., with BSC's from two or more vendors. In some such embodiments, the AGW 514 is configured and/or provisioned, e.g., at deployment time, to use the Abis interface API of the particular type of BSC with which it is required to communicate in a particular installation. In some embodiments, an API or other interface specification or definition of the Abis interface as implemented by each BSC vendor/OEM the AGW is desired to be able to support is obtained and used as applicable to configure/provision the AGW to communicate with a particular BSC with which it is required to communicate.

Registration server 516 is configured to be used to register a BTS and/or other provider equipment with the network, e.g., to authenticate the equipment prior to providing to the equipment session keys to be used in secure communication protocols, identifying (e.g., address) information for other network elements, such as AGW 514, etc.

In some embodiments AGW 514 aggregates data associated with multiple base transceiver stations and provides communication to/from the BSC via a fewer number of physical BSC ports (e.g., a single port). In various embodiments, use of PDN 508 and AGW 514 to transport data between base transceiver stations such as BTS 504 and BTS 506, on the one hand, and BSC 518, on the other, makes it commercially feasible to provide a small from factor and/or relatively low capacity BTS to provide dedicated service to individuals and/or relatively small groups of users, such as a household or small business, since in addition to not requiring a BSC port for each BTS a dedicated T-1/E-1 line is not required. Such indoor (e.g., home/office) environments are likely to exhibit long lasting fades such as described above, e.g., due to interference from obstacles such as file cabinets and other furniture, and the techniques described herein, while limited to the indoor environment, are likely useful in such an environment since the mobile station (MS) user likely will be moving, if at all, only on foot and therefore not very quickly relative to the position of the small form factor base station, such that it is less likely that the user's experience of call quality will be affected by omitting to update the equalizer taps during periods in which the signal-to-noise and/or other quality criteria is/are not met.

While the example shown in FIG. 5 and in other embodiments described herein involves a GSM network and/or uses GSM nomenclature to refer to network elements, the techniques described herein are applied in other embodiments to other types of mobile telecommunications networks, and in particular may be applied wherever a plurality of relatively low capacity base transceiver stations need to exchange mobile communication data with a base station controller or other node having a limited number of relatively very high capacity ports or other resources.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method of data distribution, comprising:
receiving, by a GPS receiver, a GPS signal from one or more GPS satellites;
encrypting and compressing GPS data associated with at least a portion of the GPS signal;
broadcasting, via a power line, the GPS data to a plurality of small scale base transceiver stations that are part of a mobile cellular communication network, wherein the broadcasted data includes an identifier that identifies the GPS receiver;
receiving, by the small scale base transceiver stations, the GPS data;
extracting, by the small scale base transceiver stations, timing information from the GPS data;
using the timing information extracted from the GPS data to synchronize wireless communications with mobile wireless communication devices; and
communicating wireless mobile communications data from the small scale base transceiver stations, via the Internet, to an aggregated gateway that is connected, a dedicated line, to a base station controller, wherein each small scale base transceiver station is individually coupled to the Internet to connect to the aggregated gateway where the wireless mobile communications data from the small scale base transceiver stations is aggregated, for the first time on its way from the small scale base transceiver stations to the base station controller, by the aggregated gateway, wherein a registration server is coupled to the aggregated gateway and is coupled to the Internet, wherein the registration server is configured to authenticate each of the small scale base transceiver stations prior to providing session keys to the authenticated small scale base transceiver station for use in secure communications and prior to providing, to the authenticated small scale base transceiver station, address information for the aggregated gateway.

2. A method as recited in claim 1, wherein distributing the GPS data includes superimposing a low voltage differential data signal on a hot line and a neutral line of the power line.

3. A method as recited in claim 1, further comprising receiving power via the power line.

4. A method as recited in claim 1, wherein distributing the GPS data includes performing power line data communication protocol processing.

5. A method as recited in claim 4, wherein the power line data communication protocol processing is performed using one or more of the following protocols: a HomePlug protocol, a Broadband over Power line protocol, and a Narrowband over Power Line protocol.

6. A method as recited in claim 1, wherein at least a portion of the distributed signal is used to establish a reference.

7. A method as recited in claim 6, wherein the reference includes one or more of the following references: a location reference, a time reference, a timing reference, and a frequency reference.

8. A method as recited in claim 1, wherein the power line is at least a portion of an electrical wiring infrastructure of a building.

9. A method as recited in claim 1, wherein the aggregated gateway aggregates the wireless mobile communications data from the small scale base transceiver stations and provides the aggregated data to the base station controller using time division multiplexing.

10. A method as recited in claim 1, wherein the aggregated gateway is coupled to a registration server and to an element management server, wherein the aggregated gateway and the registration server are coupled to the Internet, and wherein the aggregated gateway, the registration server and the element management server are communicatively disposed on the same side of the mobile cellular communication network with respect to the base station controller.

11. A method as recited in claim 1, wherein the aggregated gateway receives wireless mobile communications data in accordance with one communication protocol and sends the aggregated data to the base station controller in accordance with another communication protocol.

12. A method as recited in claim 1, wherein each small scale base transceiver station comprises a DSP that is configured to perform wireless mobile communications data processing on wireless mobile communications data and that is also configured to process the GPS data received from the power line.

13. A system for signal distribution, comprising:
- a receiver configured to receive a GPS signal from one or more GPS satellites;
- a communication interface configured to distribute via a power line, GPS data associated with at least a portion of the GPS signal to a plurality of small scale base transceiver stations that are part of a mobile cellular communication network; and
- small scale base transceiver stations configured to receive the GPS data from the power line, to extract extracting timing information from the GPS data and to synchronize wireless communications with mobile wireless communication devices by using the extracted timing information,
- wherein the small scale base transceiver stations communicate wireless mobile communications data over the Internet to an aggregated gateway that is connected, via a dedicated interface, to a base station controller,
- wherein the aggregate gateway receives the wireless mobile communications data in accordance with one communication protocol and sends the aggregated data to the base station controller in accordance with another communication protocol,
- wherein each small scale base transceiver station is individually coupled to the Internet and uses the Internet and not an Abis interface to connect to the aggregated gateway where the wireless mobile communications data from the small scale base transceiver stations is aggregated, for the first time on its way from the small scale base transceiver stations to the base station controller, by the aggregated gateway, wherein the aggregated gateway receives the wireless mobile communications data from the Internet and sends the aggregated wireless mobile communications data over an Abis interface for the first time on its way from the small scale base transceiver stations to the base station controller, and
- wherein a registration server is coupled to the aggregated gateway and is coupled to the Internet, wherein the registration server is configured to authenticate each of the small scale base transceiver stations prior to providing session keys to the authenticated small scale base transceiver station for use in secure communications and prior to providing, to the authenticated small scale base transceiver station, address information for the aggregated gateway.

14. A system as recited in claim 13, wherein the communication interface is configured to distribute the GPS data including by superimposing a low voltage differential data signal on a hot line and a neutral line of the power line.

15. A system as recited in claim 13, wherein the system is powered at least in part by power received via the power line.

16. A system as recited in claim 13, wherein the communication interface is configured to distribute the GPS data including by performing power line data communication protocol processing.

17. A system as recited in claim 16, wherein the power line data communication protocol processing is performed using one or more of the following protocols: a HomePlug protocol, a Broadband over Power line protocol, and a Narrowband over Power Line protocol.

18. A system as recited in claim 13, wherein at least a portion of the distributed signal is used to establish a reference.

19. A system as recited in claim 18, wherein the reference includes one or more of the following references: a location reference, a time reference, a timing reference, and a frequency reference.

20. A system as recited in claim 13, wherein the power line is at least a portion of an electrical wiring infrastructure of a building.

21. A system as recited in claim 13, wherein the aggregated gateway aggregates the wireless mobile communications data from the small scale base transceiver stations and provides the aggregated data to the base station controller using time division multiplexing.

22. A system as recited in claim 13, wherein the aggregated gateway is coupled to a registration server and to an element management server, wherein the aggregated gateway and the registration server are coupled to the Internet, and wherein the aggregated gateway, the registration server and the element management server are communicatively disposed on the same side of the mobile cellular communication network in relation to the base station controller.

23. A system as recited in claim 13, wherein the aggregated gateway receives wireless mobile communications data in accordance with one communication protocol and sends the aggregated data to the base station controller in accordance with another communication protocol.

24. A system as recited in claim 13, wherein each small scale base transceiver station comprises a DSP that is configured to perform wireless mobile communications data processing on wireless mobile communications data and that is also configured to process the GPS data received from the power line.

25. A system as recited in claim 13, wherein the aggregated gateway communicates with the base station controller only using a single physical BSC port.

26. A system as recited in claim 13, wherein the aggregated gateway is coupled to the Internet through a router and firewall device, wherein a registration server is coupled to the aggregated gateway, wherein the registration server is coupled to the router and firewall device, wherein the router and firewall device is connected to the Internet and provides security with respect to the aggregated gateway and the registration server.

27. A system for signal distribution, comprising:
- a receiver configured to receive a GPS signal from one or more GPS satellites;
- a communication interface configured to distribute via a power line, GPS data associated with at least a portion of the GPS signal to a plurality of small scale base transceiver stations that are part of a mobile cellular communication network; and
- small scale base transceiver stations configured to receive the GPS data from the power line, to extract extracting timing information from the GPS data and to synchronize wireless communications with mobile wireless communication devices by using the extracted timing information, wherein the small scale base transceiver stations communicate wireless mobile communications data over the Internet to an aggregated gateway that is connected, via a dedicated interface, to a base station controller, wherein each small scale base transceiver station is directly connected to the Internet to connect to the aggregated gateway where the wireless mobile communications data from the small scale base transceiver stations is aggregated, for the first time from the small scale base transceiver stations to the base station controller, by the aggregated gateway, and wherein a registration server is coupled to the aggregated gateway and is coupled to the Internet, wherein the registration server is configured to authenticate each of the small scale base transceiver stations prior to providing session keys to the authenticated small scale base transceiver station for use in secure communications and prior to providing, to the authenticated small scale base transceiver station, address information for the aggregated gateway.

\* \* \* \* \*